Nov. 14, 1950
R. R. AMBLER ET AL
2,529,859
MACHINE FOR APPLYING COVERING MATERIAL TO ENDLESS BELTS
Filed Nov. 29, 1946
4 Sheets-Sheet 1
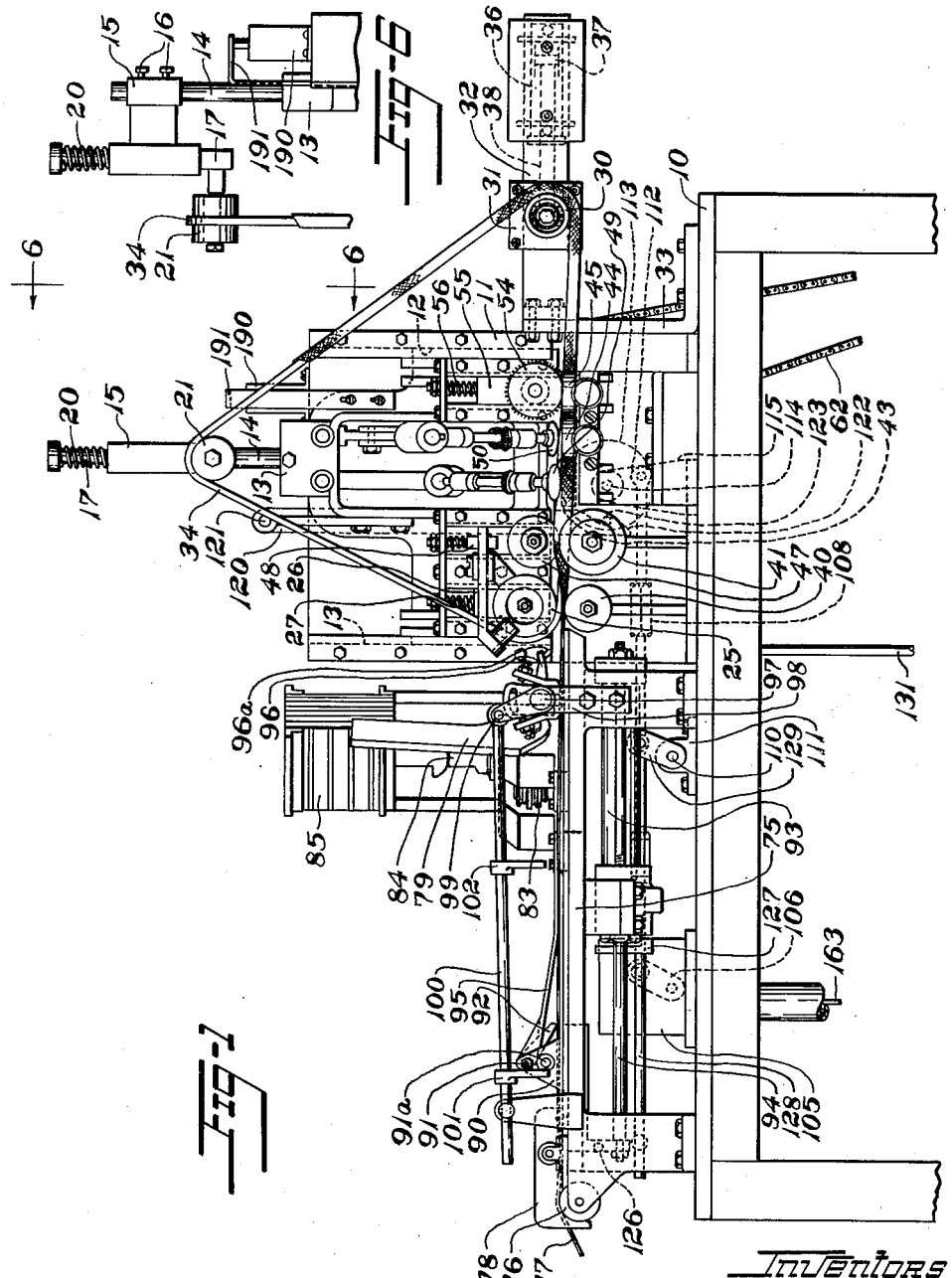
Inventors
Robert R. Ambler
Roger D. Weston
By
Att'y

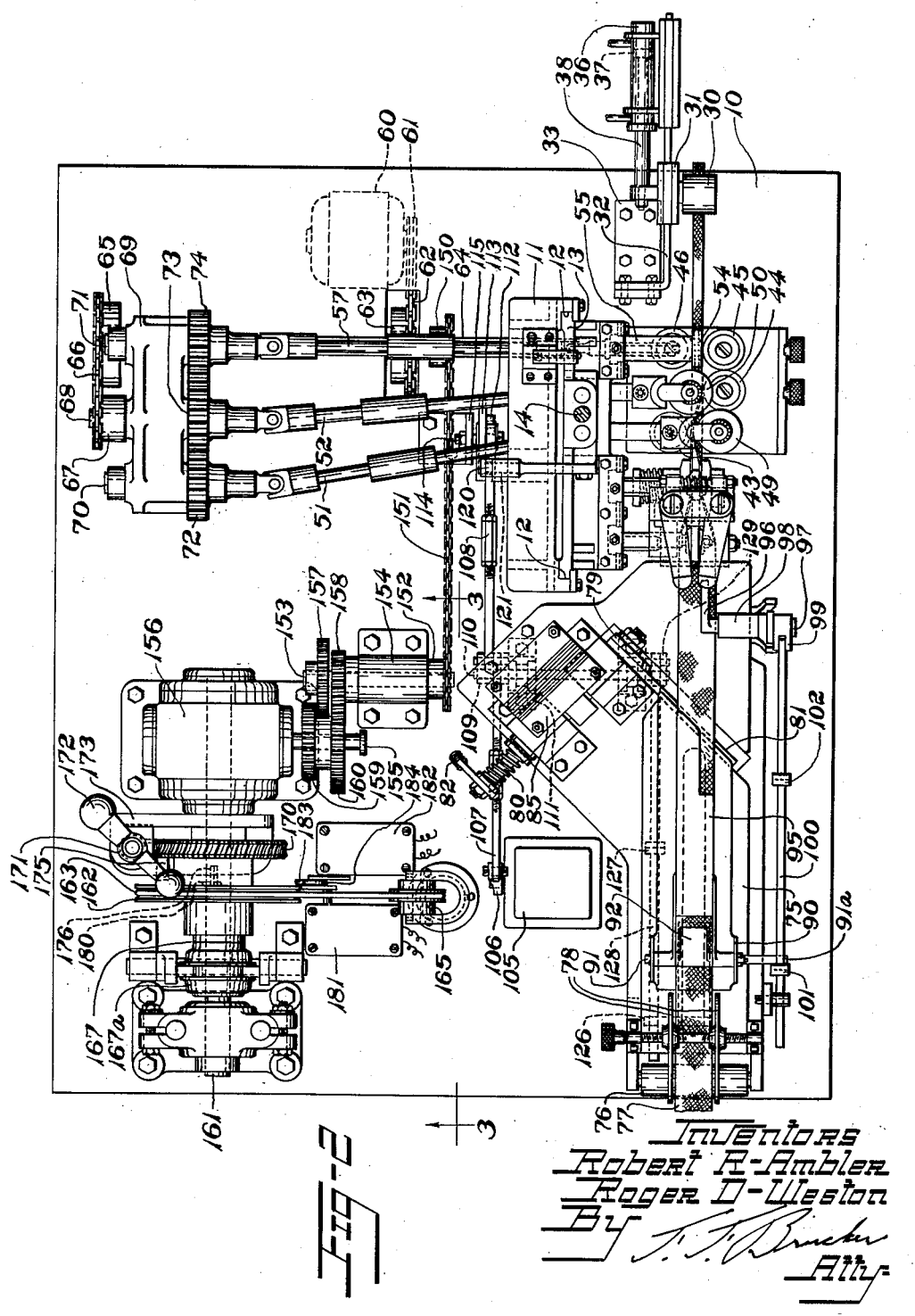

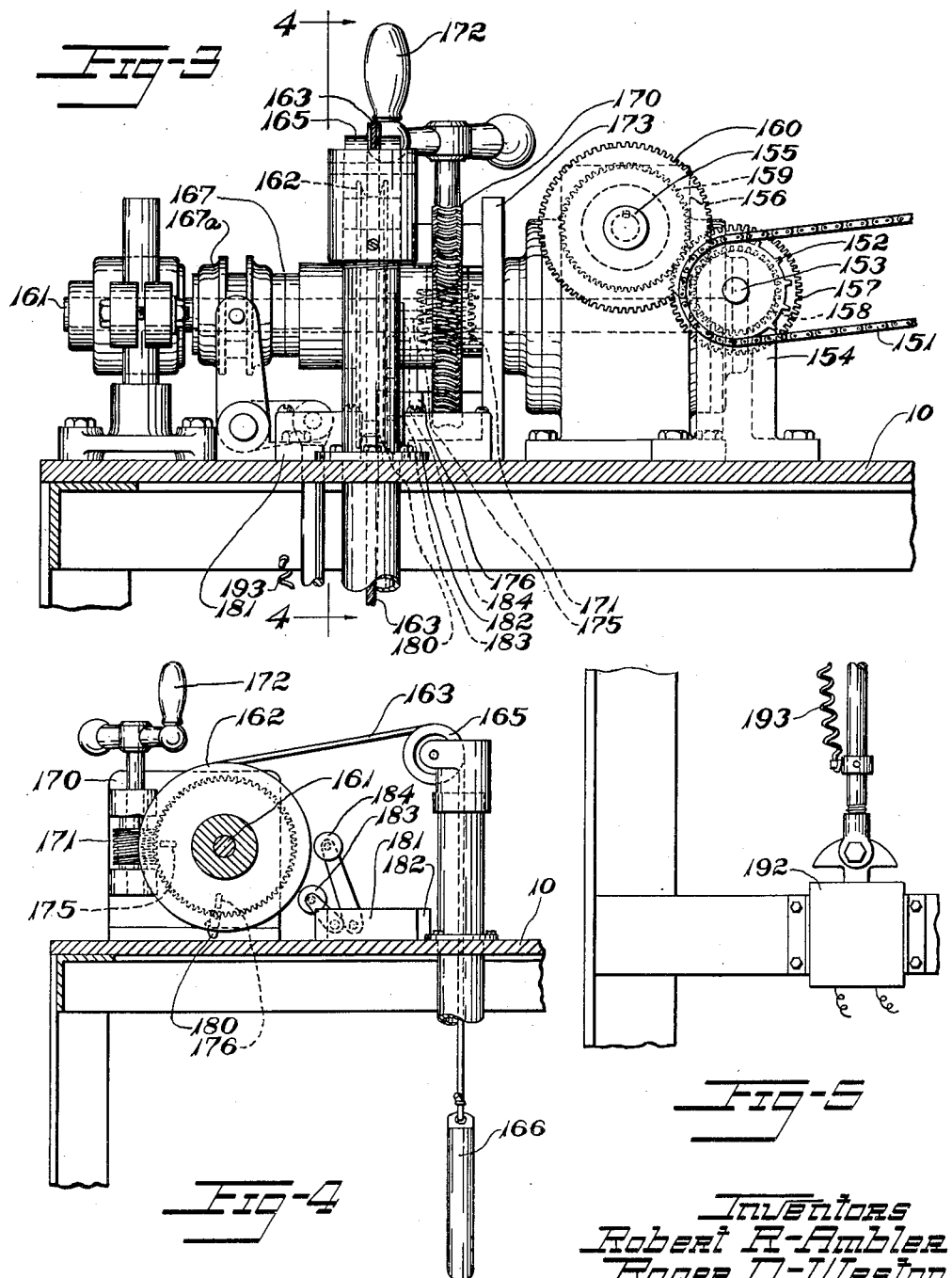

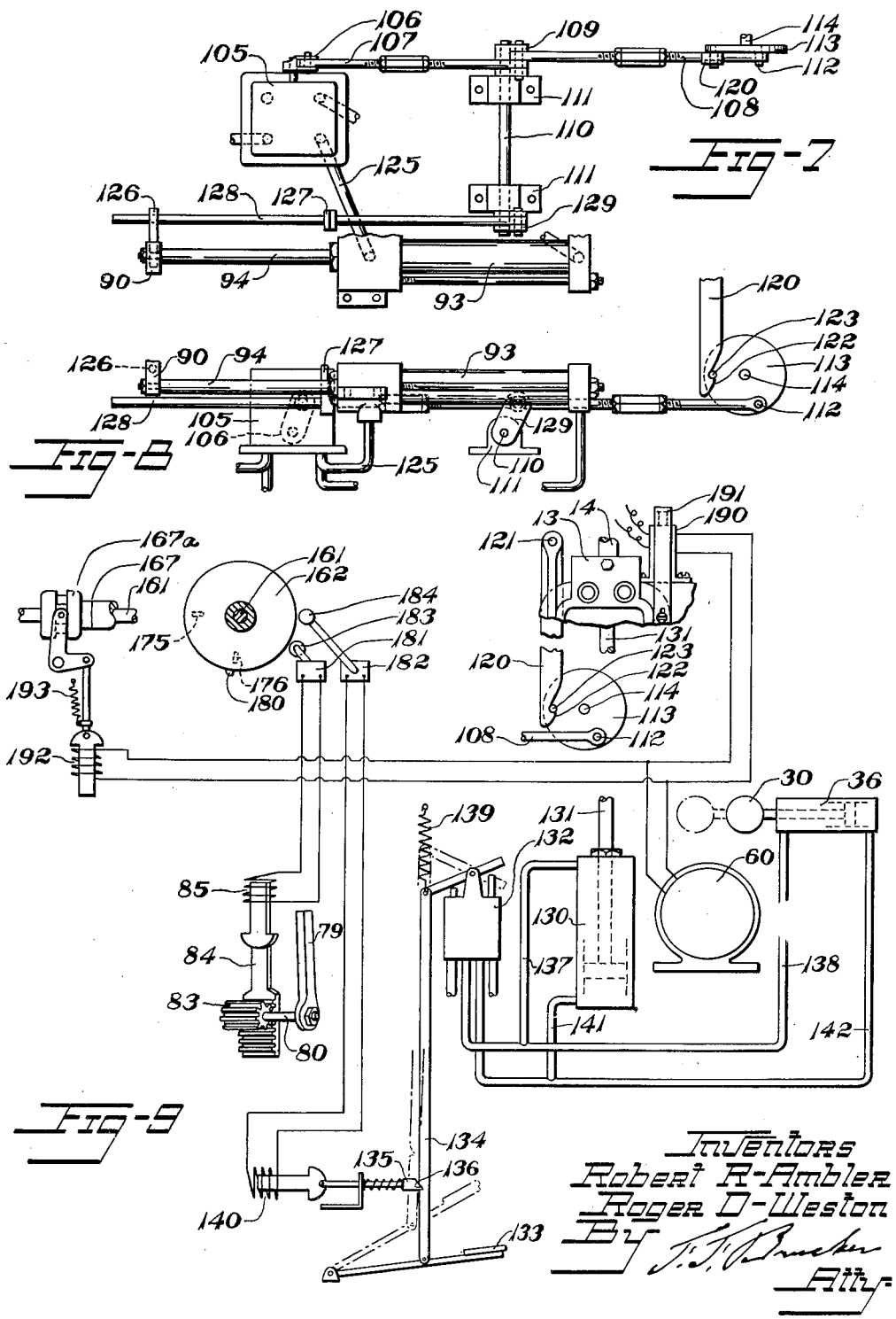

Patented Nov. 14, 1950

2,529,859

UNITED STATES PATENT OFFICE 2,529,859

MACHINE FOR APPLYING COVERING MATERIAL TO ENDLESS BELTS

Robert R. Ambler, Akron, and Roger D. Weston, Cuyahoga Falls, Ohio, assignors to The B. F. Goodrich Company, New York, N. Y., a corporation of New York Application November 29, 1946, Serial No. 713,016

8 Claims. (Cl. 154—3)

This application relates to the covering of endless articles with strip material and is particularly useful in the covering of endless belts.

In the manufacture of endless belts, such as V-belts for use on grooved pulleys, an endless flexible body of rubber-like material and reinforcing cords or wires is enclosed in a cover of rubberized bias cut fabric which must be folded about the body and adhered thereto before the belt is vulcanized.

Machines proposed heretofore for the purpose usually have required the covering material to be precut to substantially the length of the belt and as some stretching has occurred during feeding of the strip the operator has been required to trim the strip at the splice occurring at the meeting ends of the strip.

The present invention has for one of its objects to draw the strip material from a roll supply and to cut it to the correct length as it is fed onto the belt body.

Other objects are to provide for trimming the strip to length close to the applying mechanism where the fabric has a minimum opportunity to stretch, to control the cutting operation from the applying mechanism, to accurately place the strip material, and to provide high speed operation.

These and other objects will appear from the following description and the accompanying drawings.

Of the drawings,

Fig. 1 is a side elevation of apparatus constructed in accordance with and embodying the invention, parts being broken away.

Fig. 2 is a plan view thereof.

Fig. 3 is a sectional view taken on line 3—3 of Fig. 2.

Fig. 4 is a sectional view taken on line 4—4 of Fig. 3.

Fig. 5 is a detail view showing the solenoid for operating the clutch.

Fig. 6 is a detail sectional view taken on line 6—6 of Fig. 1.

Fig. 7 is a detail plan view of part of the strip feeding mechanism, parts being broken away.

Fig. 8 is a side elevation of the same.

Fig. 9 is a wiring and pipe diagram of the apparatus.

Referring to the drawings, the numeral 10 designates a table to which is secured a frame member 11 formed with a vertical guideway 12 in which a carriage 13 is slidably mounted for movement downwardly to and upwardly from a covering station. Fixed to the carriage is a vertical rod 14 on which a bracket 15 is mounted for vertical adjustment and secured to the rod by set screws 16. Bracket 15 has a vertical passage therethrough in which a support 17 is slidably mounted. Support 17 is held in elevated position by a compression coil spring 20 about the support. A guide wheel 21 is rotatably mounted on the support 17. A guide wheel 25 is mounted for free rotation about a shaft fixed to a carriage 26 slidably mounted on carriage 13 and pressed downwardly by a coil spring 27.

A third guide wheel 30 is rotatably mounted on a spindle fixed to a carriage 31 slidably mounted on a horizontal guide bar 32 supported from table 10 by a bracket 33. All of the wheels 21, 25 and 30 have parallel horizontal axes and the arrangement is such that a belt body 34 may be looped about the three wheels to present a horizontal reach thereof at a covering station for covering it. The arrangement of wheels 21 and 25 whereby they are supported by the carriage 13 permits raising them with the carriage 13, as hereinafter explained, to permit placing and removing the belt.

Carriage 31 being moveable along the guide bar 32 permits tensioning and releasing of tension of the belt and its movement is controlled by a double-acting pressure fluid operated cylinder 36 having a piston 37 and piston rod 38. The piston rod 38 is secured to the carriage 31 for moving it.

Carriage 13 and frame member 11 support covering mechanism including a plurality of rollers grouped in the lowered position of carriage 13 at a covering station adjacent the horizontal reach of the belt between wheel 25 and roller 59 for progressively folding strip material about the belt body. For this purpose roller 40 which is a cylindrical roller and roller 41, which is a channeled roller for turning up margins of the strip, are pivotally mounted below the horizontal reach of the belt body on the frame member 11. Also, adjustable side engaging rollers 43, 44, 45 and 46 are rotatably mounted on the frame member 11. A free-running roller 47 is rotatably mounted on a carriage 48 slidably secured to carriage 13 and spring-pressed downwardly. Stitching rollers 49 and 50 are driven rollers secured to the carriage 13 and driven through universal jointed and slip sleeve shafts 51, 52 respectively which permit raising and lowering them with the carriage 13.

For advancing the belt body progressively through the folding rollers, a drive roller 54 having sharp pin points on its periphery to insure positive driving, is rotatably mounted on a carriage 55 slidably mounted on carriage 13 and urged downwardly by a coil spring 56. A shaft 57, universally jointed and slip sleeved drives this roller.

Driving of shafts 51, 52 and 57 is accomplished by a motor 60 which has a sprocket 61 engaging a chain 62 which in turn drives a sprocket 63 fixed to shaft 64. Shaft 64 has a sprocket 65 fixed thereto. A chain 66 thereon drives a sprocket 67 on a shaft 68. Shaft 68 is journaled in a bracket 69 fixed to the table. Other shafts 70, 71 parallel to shaft 68 are journaled in the same bracket and are driven from shaft 68 by gears 72, 73, 74 fixed to the shafts and meshing with each other. Shafts 68, 70 and 71 are connected to drive shafts 52, 51 and 57, respectively.

For advancing strip material to the covering mechanism, a platform 75 is fixed to the table 10 in alignment with the horizontal reach of the belt body. A roller 76 is mounted at the receiving end of the table for free rotation and the strip material 77 from a supply thereof is passed thereover. Adjustable guides 78 center the strips. A knife 79 for cutting off the strip material on the bias is mounted on a shaft 80 supported for rotation in bearings secured to the platform and cooperates with a stationary blade 81 at a gap in the platform to shear the strip. The knife is normally held above the platform, as seen in Fig. 1 by a coil spring 82 and its shaft has a pinion 83 engaging a rack 84 adapted to be actuated by a solenoid 85 to lower the knife and cut the strip.

For advancing the strip past the knife, a carriage 90 is mounted to slide along the platform and carries a shaft 91 in bearings at the sides of the strip which pivotally support a feed finger 92. A fluid operated double-acting cylinder 93 is mounted below the platform and its piston rod 94 is secured to the carriage 90 for moving it toward and from the covering mechanism. Pivotally mounted on the shaft 91 is a pressure foot 95 which overlies the strip of fabric 77 and keeps it from buckling.

For retaining the leading end of the strip when the feed carriage returns, a holding finger 96 is pivotally mounted on a shaft 97 rotatably mounted in a bearing 98 fixed to the platform 75. An arm 99 pivotally mounted on the same shaft has its upper end pivotally connected to a rod 100 having adjustable stops 101, 102 thereon. Arm 99 and finger 96 have frictional slip means engaging them to permit lost motion therebetween. Shaft 91ª extends between stops 101, 102 so that as carriage 90 moves forward to feed the stock it engages stop 102 depressing finger 96 against the strip and when carriage 90 is retracted it contacts stop 101 near the end of its movement and raises the finger. Finger 96 has sharp needle points 96ª thereon for holding the strip against retraction.

Movement of carriage 90 is controlled by a reversing valve 105 actuated by an arm 106 and a rod connection 107 thereto. Rod 107 and a second rod 108 are pivotally carried by an arm 109 fixed to a shaft 110 rotatably mounted in bearings 111 fixed to the table 10. Rod 108 has its opposite end pivotally connected at 112 to a disc 113 fixed to a shaft 114. The shaft 114 is rotatably mounted in a bearing 115 fixed to the table 10.

For rotating the disc 113 in one direction, a latch 120 is pivotally mounted at 121 on carriage 13 and has a hook 122 adapted to catch a pin 123 on the disc when the carriage 13 is being raised, thereby rotating the disc in a clockwise direction as seen in Figs. 1, 8 and 9, shifting rod 108 to the left and operating valve 105 to admit fluid under a pressure through pipe 125 to the left end of cylinder 93, causing carriage 90 to advance the strip material to the covering mechanism. Near the end of its stroke the piston rod, by means of a stop arm 126 thereon, contacts a stop 127 on a rod 128. Rod 128 is connected to a crank arm 129, fixed to shaft 110, and this returns crank 113 to its original position. The return to original position is made possible by a spring in the valve 105 which tends to hold the arm 106 in either of its extreme positions. This spring when thrown over center advances the disc 113 to release the latch 120 from the pin 123 and as the latch then advances above the pin, clearance is provided for return of the pin without engagement with the hook 122.

For raising and lowering the carriage, a double-acting pressure fluid operated cylinder 130 is fixed to the table 10 and its piston rod 131 is connected to carriage 13. A reversing valve 132, see Fig. 9, is fixed to the machine frame and is operated by a foot pedal 133 to which it is connected by a rod 134. A latch 135 is spring pressed against the rod, and in the depressed position of the pedal, enters a notch 136 in rod 134 and holds the valve in a position to admit pressure to the upper end of cylinder 130 by way of a pipe 137. At the same time the valve admits fluid through a pipe 138 to the left end of cylinder 36, tensioning the belt. A coil spring 139 urges the rod 134 and pedal upwardly. A solenoid 140 is arranged, when energized, to withdraw latch 135 and permit the rod 134 and pedal 133 to rise. This reverses valve 132 admitting fluid to the lower end of cylinder 130 through pipe 141 and to the right end of cylinder 36 through a pipe 142 thereby raising carriage 13 and releasing tension on the belt.

The invention includes a timing mechanism for controlling the cutting of the strip material to length required by a belt and for resetting the starting mechanism. For this purpose a sprocket 150 is fixed to the shaft 64 and drives a chain 151 which engages a sprocket 152 fixed to a shaft 153. Shaft 153 is journaled in a bearing 154 mounted on the table 10. Shaft 153 drives a shaft 155 of a speed reducer 156 through gears 157, 158 fixed to shaft 153 and sliding change gears 159, 160 splined to shaft 155, the arrangement being such that different reduction ratios may be employed for belts of different lengths.

The speed reducer drives a shaft 161. Journaled on shaft 161 is a grooved pulley 162 which serves the purpose of a timing cam carrier. A cord 163 is wrapped about this pulley in the groove thereof with one end of the cord fixed to the pulley. The other end of the cord passes over a guide pulley 165 and is secured to a weight 166. The pulley 162 may be secured to the shaft by a clutch 167 operated by a clutch collar 167ª. The arrangement is such that when the clutch is engaged the pulley is driven by shaft 161 and lifts the weight 166, and when the clutch is disengaged, the weight drops and returns the pulley.

Rotatably mounted about shaft 161 adjacent the pulley 162 is a worm gear 170. A worm 171 engages the worm wheel and has a handle 172 secured thereto. The worm is journaled in a bracket 173 secured to the table 10. Worm wheel 170 has a projecting stop 175 adapted to engage a stop 176 on the pulley 162 and arrest its rotation. The arrangement is such that by turning the worm, the worm wheel with its stop is rotated to any desired position and the position of the pulley at engagement by the clutch is determined.

The pulley 162 has a cam 180 projecting therefrom. A pair of limit switches 181, 182 are secured to the table 10 near the pulley 162 and have roller arms 183, 184 respectively adapted to be depressed by contact with the cam 180. Limit switch 181 is in the circuit of solenoid 85 and causes the knife 79 to cut the strip. Limit switch 182 is in the circuit of solenoid 140 and closing of it withdraws latch 135, permitting pedal 133 to rise reversing valve 132 so as to cause carriage 13 to rise and roller 30 to release tension on the belt at the end of the covering operation. The arrangement is such that at any setting of the worm wheel 170, the covering strip is cut before the carriage 13 is raised to release a covered belt.

A limit switch 190 is secured to the frame member 11 in position to be contacted by a stop 191 secured to the carriage 13. Switch 190 is open when carriage 13 is at its upper position and closes when carriage 13 is lowered. Closing of switch 190 starts motor 60 and at the same time energizes a solenoid 192 which engages the clutch 167 by moving clutch collar 167ª. A coil spring 193 acts to return the clutch to open position.

The operation of the apparatus is as follows:

With the carriage 13 raised and the tension pulley 30 advanced, an endless belt body is placed about pulleys 21, 25, 30. A strip of covering material is advanced across the platform 75 and its forward end is cut on the bias at a position where it will be engaged by the belt body. The operator depresses the treadle 133 to a position where it is locked by the latch 135. Depression of the pedal actuates valve 132 to cause the carriage 13 to descend and also to cause pulley 30 to move to belt tensioning position. As carriage 13 is lowered it releases limit switch 190 starting motor 60 and engaging clutch 167. Lowering of carriage 13 brings roller 54 into engagement with the belt body advancing it circumferentially and drawing the strip material onto the belt body where it is formed about the belt body.

The stop on the worm wheel 170 having been set for the desired belt circumference, the pulley 162 rotates to a position where its cam 180 moves switch arm 183. This lowers knife block 79 cutting the covering material. Shortly thereafter cam 180 moves switch arm 184. This energizes solenoid 140 withdrawing latch 135. The pedal 133 then rises under influence of spring 139 and reverses valve 132, thereby raising carriage 13. As carriage 13 reaches its top position, it engages switch 190 stopping motor 60 and releasing clutch 167. The weight 166 then drops rotating pulley 162 until its stop engages the stop on the worm wheel, resetting the timing apparatus. Also as carriage 13 rises its latch 120 engages pin 123 on disc 113, thereby reversing valve 105. This advances the leading end of the strip material to a position where it will overlie roller 40 for covering the next belt and then returns the strip feeding carriage 90 to its original position. The covered belt is then removed from the machine.

Variations may be made without departing from the scope of the invention as it is defined by the following claims.

We claim:

1. Apparatus for feeding strip covering material to an endless flexible article supported in tensioned condition about pulleys, said apparatus comprising means for driving at least one of the pulleys to progressively advance the article thereabout, a feed table in alignment with a reach of the article, reciprocating means movable along the table responsive to operation of said driving means for advancing strip material from a supply thereof into adhesive engagement with the article, a movable knife mounted at said table for severing the strip material into lengths, and a timer associated with said driving means for initiating cutting movements of said knife, said timer comprising a rotatable disc having a stop thereon, a coaxial adjustable disc having a stop for engaging the stop on the rotatable disc, biasing means associated with the rotatable disc normally holding said stops in engagement with each other, a clutch between said driving means and said rotatable disc permitting free rotation of said disc under influence of said biasing means, a cam on said rotatable disc, means in the path of said cam and actuated thereby for operating said knife, means for simultaneously starting said driving means and engaging said clutch, and means engageable by the cam of said rotatable disc for stopping said driving means and disconnecting said clutch after a cutting movement of said knife has been completed to permit return of said rotatable disc under influence of said biasing means.

2. Apparatus for feeding strip covering material to a flexible belt supported in tensioned condition about pulleys, said apparatus comprising means for driving at least one of the pulleys to progressively advance the belt thereabout, a feed table in alignment with a reach of the belt, reciprocating means movable along the table responsive to operation of said driving means for advancing strip material from a supply thereof into adhesive engagement with the belt, a movable knife mounted at said table for severing the strip material into lengths, and a timer associated with said driving means for initiating cutting movements of said knife, said timer comprising a rotatable disc having a stop thereon, a coaxial adjustable disc having a stop for engaging the stop on the rotatable disc, biasing means associated with the rotatable disc normally holding said stops in engagement with each other, a clutch between said driving means and said rotatable disc permitting free rotation of said disc under influence of said biasing means, a cam on said rotatable disc, means in the path of said cam and actuated thereby for operating said knife, means for simultaneously starting said driving means and engaging said clutch, and means engageable by the cam of said rotatable disc for stopping said driving means and disconnecting said clutch after a cutting movement of said knife has been completed to permit return of said rotatable disc under influence of said biasing means, said apparatus including manually operable means for adjusting said adjustable disc to belts of different circumference.

3. Apparatus for feeding strip covering material to an endless flexible article supported in tensioned condition about pulleys to present a straight reach of the article for covering, said apparatus comprising forming means including stationary forming rolls and opposed forming rolls supported on a carriage for movement toward and from said stationary forming rolls, said opposed forming rolls including a driven roll for progressively advancing the article through said forming means, a feed table in alignment with said reach of the article, reciprocating means movable along said feed table responsive to movement of said carriage for advancing strip material from a supply thereof into adhesive engagement with said article, a movable knife associated with said feed table for severing the strip material into lengths, means for advancing said carriage into forming and driving position, a timer for controlling cutting movement of said knife and return movement of said carriage, and means associated with said carriage responsive thereto during return movement of said carriage for resetting said timer.

4. Apparatus for feeding strip covering material to an endless flexible belt supported in tensioned position about pulleys to present a straight reach of the belt for covering, said apparatus comprising forming means including stationary forming rolls and opposed forming rolls supported on a carriage for movement toward and from said stationary forming rolls, said opposed forming means including a driven roll for progressively advancing the belt through said forming means, a feed table in alignment with said reach of the belt, reciprocating means movable along said feed table for advancing strip material from a supply thereof into adhesive engagement with said belt, a movable knife associated with said feed table for severing the strip material into lengths, means for advancing said carriage into forming and driving position, a timer for controlling cutting movement of said knife and return movement of said carriage, and means associated with and responsive to said carriage during return movement of said carriage for resetting said timer and advancing said reciprocating means to feed forward the leading end of the strip material for a succeeding operation.

5. Apparatus for applying a strip covering to an endless flexible article, said apparatus comprising a movable carriage having means for supporting the article and presenting a substantially straight reach thereof for covering, means for moving said carriage to and from a covering station, means at said station for folding a strip of material about the article progressively in the region of its straight reach, said folding means including means for advancing the article circumferentially, feeding means presenting the leading end of the strip material at said folding means, a cutter in the path of the strip material for severing a trailing end of the material from a supply thereof, and a timer for controlling operation of said cutter, said timer including a timing cam for operating said cutter, means on the article advancing means for advancing said cam, and means actuated by movement of said carriage from said covering station for resetting said cam.

6. Apparatus for applying a strip covering to an endless flexible article, said apparatus comprising a movable carriage having means for supporting the article and presenting a substantially straight reach thereof for covering, means for moving said carriage to and from a covering station, means at said station for folding a strip of material about the article progressively in the region of its straight reach, said folding means including means for advancing the article circumferentially, feeding means presenting the leading end of the strip material at said folding means, a cutter in the path of the strip material for severing a trailing end of the material from a supply thereof, and a timer for controlling operation of said cutter, said timer including a timing cam for operating said cutter and retracting said carriage, means on the article advancing means for advancing said cam, and means actuated by said carriage in its retractive movement from said covering station for resetting said cam.

7. Apparatus for applying a strip covering to an endless flexible article, said apparatus comprising a movable carriage having means for supporting the article and presenting a substantially straight reach thereof for covering, means for moving said carriage to and from a covering station, means at said station for folding a strip of material about the article progressively in the region of its straight reach, said folding means including means for advancing the article circumferentially, feeding means presenting the leading end of the strip material at said folding means, a cutter in the path of the strip material for severing a trailing end of the material from a supply thereof, and a timer for controlling operation of said cutter, said timer including a timing cam for operating said cutter and retracting said carriage, means on the article advancing means for advancing said cam, and means actuated by said carriage in its retractive movement from said covering station for resetting said cam, said cam being adjustable to articles of different circumferences.

8. Apparatus for applying a strip covering to an endless flexible article, said apparatus comprising a movable carriage having means for supporting the article and presenting a substantially straight reach thereof for covering, means for moving said carriage to and from a covering station for folding a strip of material about the article progressively in the region of its straight reach, said folding means including means for advancing the article circumferentially, reciprocating feeding means for presenting the leading end of the strip material at the covering station, a cutter in the path of the strip for severing the trailing end of the strip from the supply thereof, and a timer for controlling said cutter, said timer including a cam for operating said cutter and retracting the article supporting carriage, means associated with the article advancing means for advancing said cam, and means actuated by said article supporting carriage in its retractive movement for resetting said cam, and said cutting means including means for advancing the leading end of the strip material upon completion of a cut to present said end at said covering station.

ROBERT R. AMBLER.
ROGER D. WESTON.

REFERENCES CITED

The following references are of record in the file of this patent:

UNITED STATES PATENTS

| Number | Name | Date |
| --- | --- | --- |
| 1,466,101 | Perrault | Aug. 28, 1923 |
| 1,827,674 | Shively | Oct. 13, 1931 |
| 2,254,394 | Ratley et al. | Sept. 2, 1941 |